United States Patent
Kearns et al.

(10) Patent No.: US 6,418,207 B1
(45) Date of Patent: Jul. 9, 2002

(54) METHOD AND SYSTEM FOR DETECTING A CHANGE IN AT LEAST ONE TELECOMMUNICATION RATE PLAN

(75) Inventors: James A. Kearns, Evanston; Crisella S. J. Chipman, Carol Stream; Keith C. Smith, Naperville; Neil M. Briskman, Lake Forest; Thomas L. Linton, Lake-In-The-Hills, all of IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/451,613

(22) Filed: Nov. 30, 1999

Related U.S. Application Data

(63) Continuation of application No. 09/239,002, filed on Jan. 27, 1999, now Pat. No. 6,023,500, which is a continuation of application No. 08/846,155, filed on Apr. 25, 1997, now Pat. No. 5,881,138.

(51) Int. Cl.[7] .............................................. H04M 15/00
(52) U.S. Cl. .................. 379/114.06; 379/116; 379/119; 379/126; 379/133
(58) Field of Search ............................ 379/111, 112.01, 379/114.01–114.03, 114.05, 114.1, 115.01, 121.01–121.02, 121.05, 126, 127.01

(56) References Cited

U.S. PATENT DOCUMENTS

| | | |
|---|---|---|
| 4,751,728 A | 6/1988 | Treat |
| 4,839,916 A | 6/1989 | Fields et al. |
| 5,027,388 A | 6/1991 | Bradshaw et al. |
| 5,400,395 A | 3/1995 | Berenato |
| 5,420,914 A | 5/1995 | Blumhardt |
| 5,425,084 A | 6/1995 | Brinskele |
| 5,425,085 A | 6/1995 | Weinberger et al. |
| 5,481,604 A | 1/1996 | Minot |
| 5,515,425 A | 5/1996 | Penzias et al. |
| 5,519,769 A | 5/1996 | Weinberger et al. |
| 5,553,124 A | 9/1996 | Brinskele |
| 5,553,131 A | 9/1996 | Minervino, Jr. et al. |
| 5,570,417 A | 10/1996 | Byers |

OTHER PUBLICATIONS

Advertisement from MCLEOD USA Businesses Services, pages: Table of Contents, 1–11 and 14 (Rev. Feb. 1997).

Advertisement from TOUCH 1, Inc., 13 pages (1995).

*Primary Examiner*—Duc Nguyen
(74) *Attorney, Agent, or Firm*—Brinks Hofer Gilson & Lione

(57) ABSTRACT

A call schedule is received that includes a plurality of sample calls to be made by an automated calling station. The plurality of sample calls are automatically placed on the network using the automated calling station. At least one final billing record corresponding to the at least one completed sample call is received. The call data is processed to determine billed cost data. The billed cost data is compared to the previous cost data and a change in the rate plan is detected based on the comparison of the billed cost data to the previous cost data.

2 Claims, 7 Drawing Sheets

METHOD AND SYSTEM FOR DETECTING A CHANGE IN AT LEAST ONE TELECOMMUNICATION RATE PLAN

CROSS-REFERENCE TO RELATED APPLICATIONS

This application is related to the following patent application, the subject matter of which is hereby incorporated by reference thereto:

"Method and System For Generating a Billing Record," U.S. patent application Ser. No. 08/845,173, filed Apr. 25, 1997, now U.S. Pat. No. 5,920,613. This application is a continuation of U.S. patent application Ser. No. 09/239,002, filed Jan. 27, 1999, now U.S. Pat. No. 6,023,500, which is a continuation of U.S. patent application Ser. No. 08/846,155, filed Apr. 25, 1997, now U.S. Pat. No. 5,881,138.

TECHNICAL FIELD

The present invention relates to telecommunication networks, and in particular, to systems and methods for detecting the change in a telecommunication service rate plan used for generating a subscriber's billing record.

BACKGROUND ART

Until recently, tariffs were legally required by the F.C.C. and state regulatory commissions for all telecommunications services. The public could rely on published tariffs to keep track of long distance services and rates. Rate information could be obtained manually by consulting the public tariffs or by using service providers who provide rate summaries and updates. Recently, the F.C.C. has eliminated the requirement of F.C.C. tariffing. In addition, many state regulatory agencies are changing their tariffing requirements.

The absence of many tariffs and the lack of generally available public information has created the need to generate and automatically detect changes in the service plans and rates for long distance carriers.

BRIEF DESCRIPTION OF THE DRAWINGS

The invention is pointed out with particularity in the appended claims. However, other features of the invention will become apparent and the invention will be best understood by referring to the following detailed description in conjunction with the accompanying drawings in which:

DETAILED DESCRIPTION OF THE PREFERRED EMBODIMENTS

The various embodiments of the present invention yield several advantages over the prior art. In one embodiment, the telecommunication system and method of the present invention generate a billing record based on a plurality of rate plans. A subscriber subscribes to a single long distance carrier. A method and automated system are presented that allow a subscriber's transaction record to be processed by the plurality of rate plans corresponding to plurality of different carriers and an amount is deducted from the total of the Lowest plan to insure that a billing record is generated that corresponds to an amount that is lower than the amount that would be billed under any of the plurality of rate plans.

In an additional embodiment, the telecommunication system and method of the present invention can automatically detect a change in a carrier's rate plan based on the bills generated by automated calling. This allows stored rate plan information to be updated in a timely matter.

Figure 1:
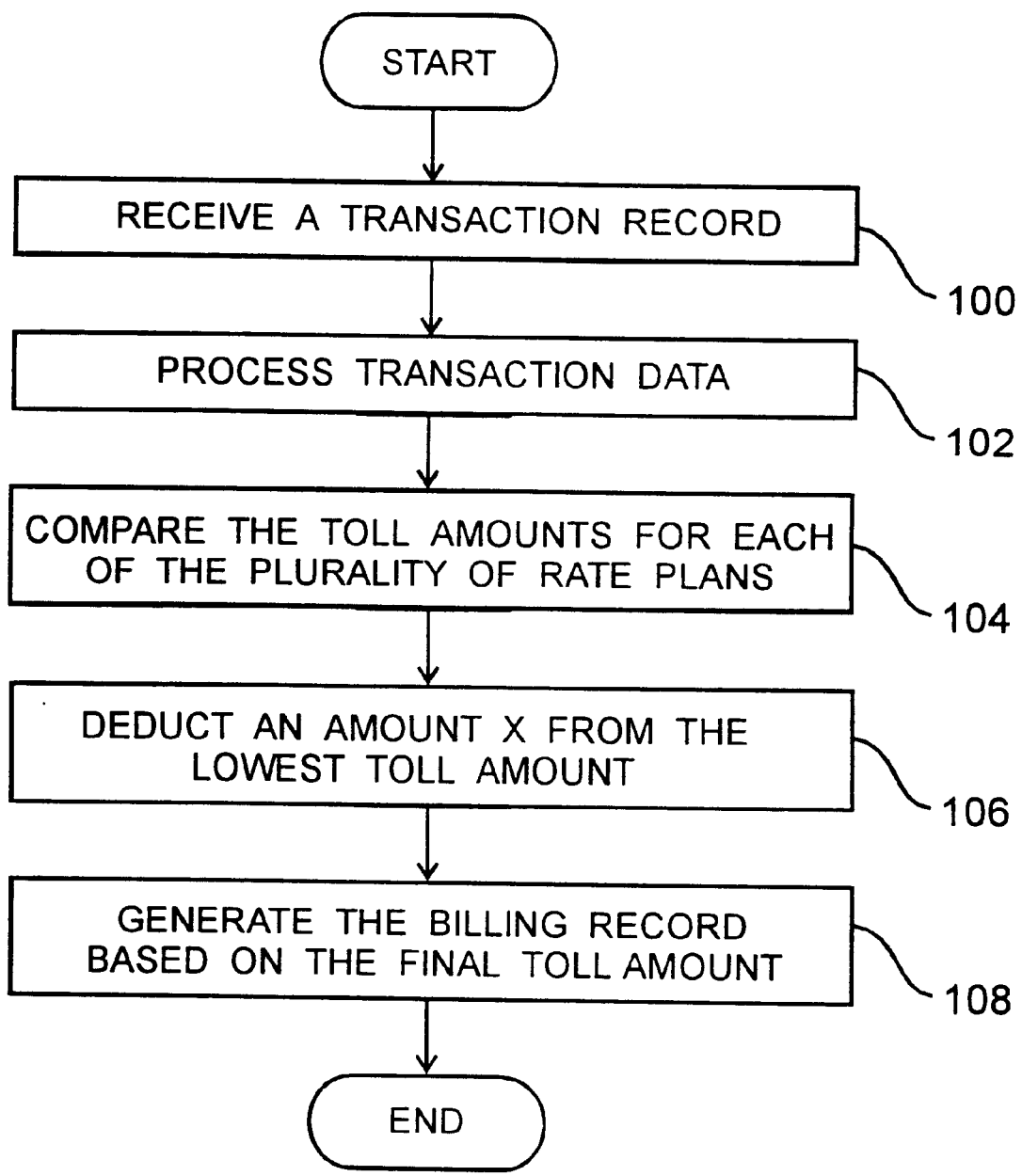
FIG. 1 presents a flowchart representation of a method in accordance with the present invention.

FIG. 1 presents a flowchart representation of a method in accordance with the present invention. In particular, the present invention presents a method of generating a billing record for at least one of the plurality of subscribers for use in a network for providing telecommunication service to a plurality of network subscribers. The method begins by receiving a transaction record as shown in step 100. The transaction record includes transaction data corresponding to at least one telephone call placed by a subscriber.

In a preferred embodiment, the transaction data corresponds to a plurality of telephone calls placed by the subscriber during a time period, such as a monthly billing period. The plurality of telephone calls include on calls for which a toll or charge is associated including intraLATA toll calls, inter-LATA toll calls and international toll calls. The transaction data includes, for each of the telephone calls, the time of day, date, duration and destination of the call.

In step 102 transaction data is processed by a plurality of rate plans, each rate plan generating a toll amount corresponding to the telephone calls of the transaction record. In a preferred embodiment, each of the plurality of rate plans correspond to the service rates for one of a plurality of interexchange carriers that are not the subscriber's chosen carrier. Optionally, at least one of the plurality of rate plans correspond to a optional calling plan corresponding to one of the interexchange carriers. In this fashion, a toll amount can be estimated that corresponds to the amount each interexchange carrier, and moreover each optional calling plan of each interexchange carrier, would bill for the telephone calls in the transaction record. The rate plan structure and the service rates can be estimated based on the results for a plurality of sample calls. Service rate information derived from publicly available information can also be used, if available.

In step 104 the toll amounts from each of the plurality of rate plans are compared to determine a lowest toll amount. In step 106 an amount x is deducted from the lowest toll amount to form a final toll amount. In a preferred embodiment of the present invention, x is a value calculated as a percentage of the lowest toll amount. In this embodiment, the final toll amount is therefore some predetermined percentage, less than 100%, of the amount that would be billed by the least of the interexchange carriers. However, in an alternative embodiment of the present invention, x is a constant value. In this alternative, the final toll amount is a fixed amount less than 100%, of the amount that would be billed.

In step 108, the billing record is generated for the subscriber based on the final toll amount. In a preferred embodiment, this billing record is transmitted to a bill generator that receives the billing record and formats and prints a billing statement for transmittal to the subscriber. In this embodiment, the billing record would include the transaction data in addition to the final toll amount. The billing record can further include the calculated toll amount for one or more of the interexchange carriers. This provides the subscriber with information to demonstrate the amount of savings by using the chosen carrier over the other interexchanae carriers.

Figure 2:
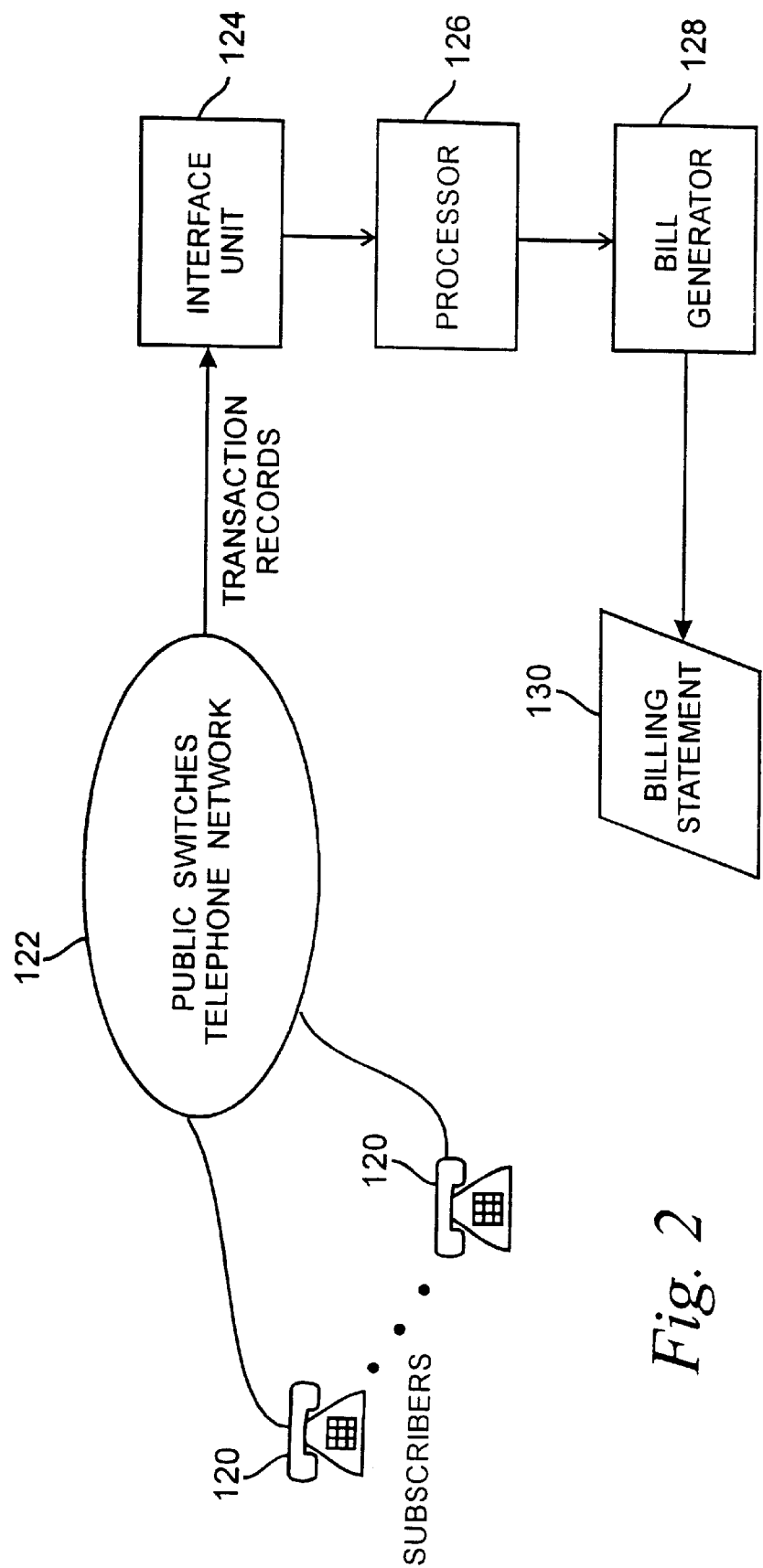
FIG. 2 presents a block diagram representation of a system in accordance with the present invention.

FIG. 2 presents a block diagram representation of a system in accordance with the present invention. In particular, FIG. 2 presents a system for implementing each of the methods and features described in conjunction with FIG. 1 described above. Network 122, in a preferred embodiment of the present invention, is a public switched telephone network (PSTN) that provides telecommunication service to a plurality of network subscribers having respective customer premises equipment 120.

Interface unit 124, coupled to the network 122 receives a transaction record, the transaction record including transaction data corresponding to at least one telephone call placed by at least one subscriber. In a preferred embodiment, the PSTN generates transaction records in a manner that is know to those of ordinary skill in the art. Call data is recorded on tapes at the originating central office. These tapes are collected periodically and mailed to a tape receipt center that includes interface unit 124. Interface unit 124 reads the tapes and converts the transaction records from Automated Message Accounting (AMA) or Call Detail Record (CDR) format into Electronic Message Interface (EMI) format. This process is also the subject of tape control, time control and error processing procedures that insure that all of the recorded transaction records are present.

In a preferred embodiment of the present invention, the transaction records are originally processed at a predetermined basic billing rate and stored in a customer toll master file that is updated daily until the end of a billing cycle. At the end of the billing cycle these transaction records, for each customer, are transferred to the processor 126.

Processor 126, in communication with the interface unit 124, processes the transaction data by a plurality of rate plans, each rate plan generating a toll amount corresponding to at least one telephone call. Processor 126 then compares the toll amounts from each of the plurality of rate plans to determine a lowest toll amount. Processor 126 deducts an amount x from the lowest toll amount to form a final toll amount, and generates the billing record for at least one of a plurality of subscribers based on the final toll amount.

In a preferred embodiment, processor 126 is implemented using an IBM mainframe computer running DB2 application software. Rate plans are implemented in software that, for example, calculates toll amounts as a function of: the approximate call mileage—determined from the originating NPA-NXX and the terminating NPA-NXX; the jurisdiction—intrastate (interLATA or intraLATA), interstate (interLATA or intraLATA) or international; the time of day and day of week of the call; the duration of the telephone call; and the billing increment—the first minute or additional minutes; in accordance with the actual rate plan of the carrier. Optional calling plans are also implemented in software that calculates, for instance, the toll rate based on the time of day, day of week and the total monthly call volume in accordance with the actual optional calling plan of the carrier.

Bill generator 128, in communication with the processor 126 receives the billing record for at least one of the plurality of subscribers and formats and prints the billing statement.

There are numerous companies that specialize in providing this service to telecommunication service providers. These companies typically use mainframe computers coupled to high-speed printers to perform this function. One such company is International Billing Services of Eldorado Hills, Calif.

Figure 3:
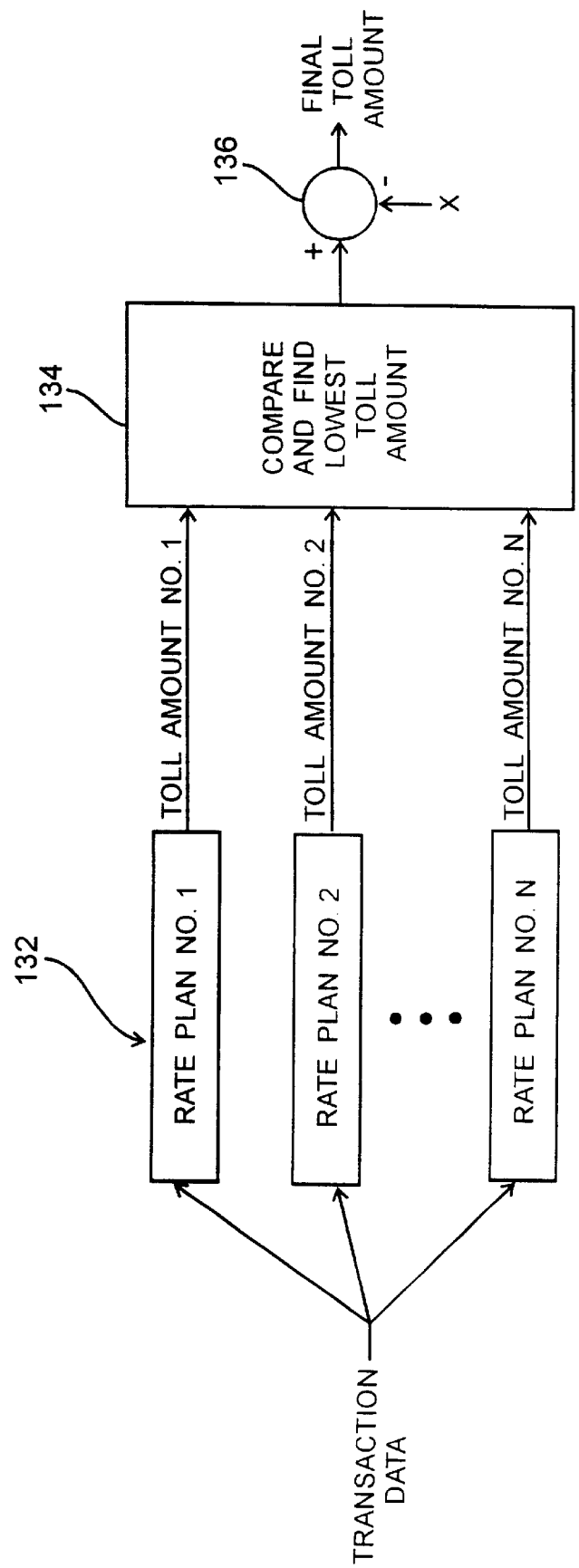
FIG. 3 presents a block diagram representation of the operation of a processor in accordance with one embodiment of the present invention.

FIG. 3 presents a block diagram representation of the operation of a processor in accordance with one embodiment of the present invention. In particular, the operation of processor 126 is represented. Processor 126 processes the transaction data by a plurality of rate plans 132, each rate plan 132 generating a toll amount corresponding to at least one telephone call. Processor 126 then uses comparator 134 to compares the toll amounts from each of the plurality of rate plans 132 to determine a lowest toll amount. Processor 126 uses summing block 136 to deduct an amount x from the lowest toll amount to form a final toll amount that can be used to generate the billing record for at least one of a plurality of subscribers based on the final toll amount.

Figure 4:
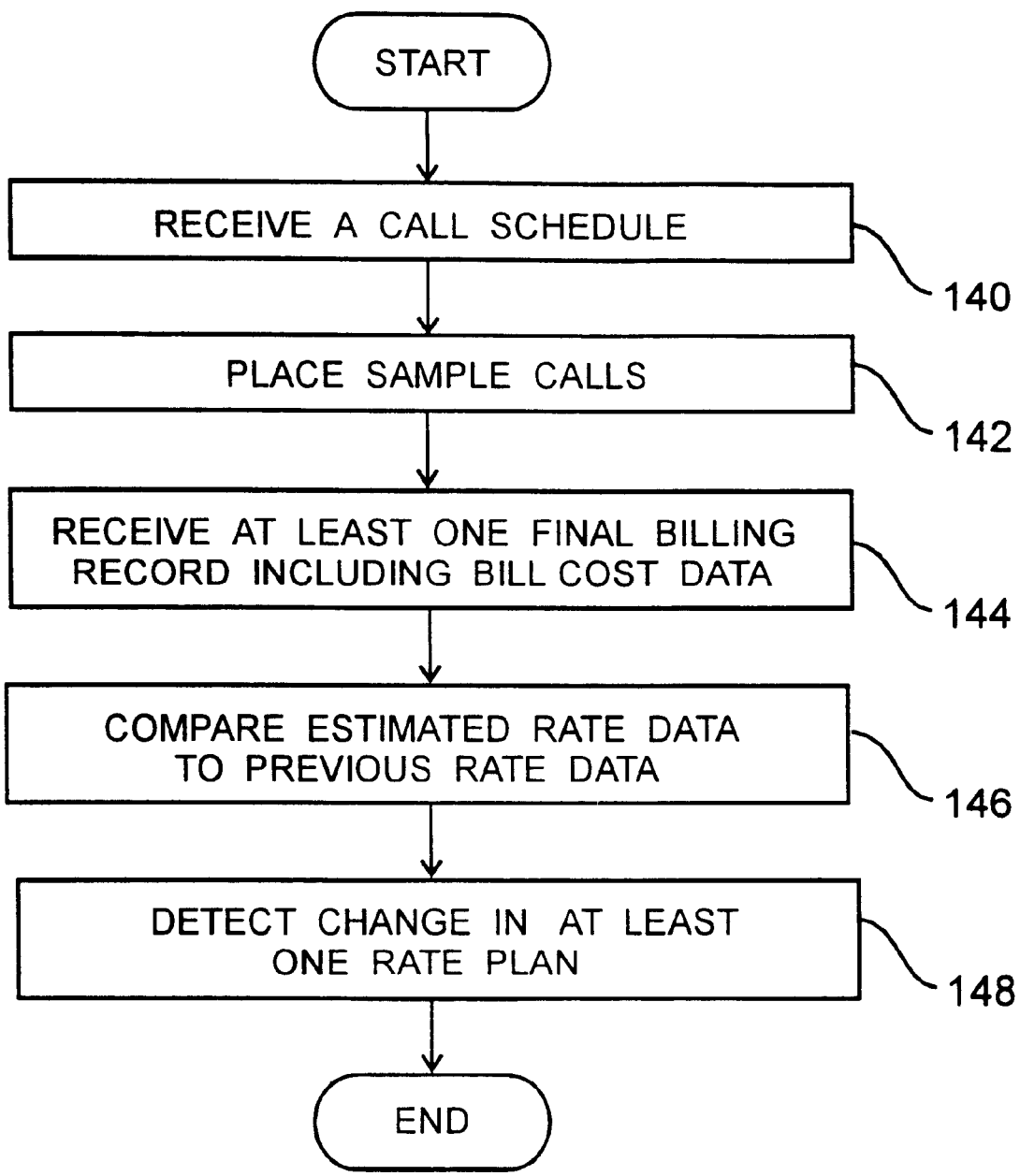
FIG. 4 presents a flowchart representation of a method in accordance with a further embodiment of the present invention.

FIG. 4 presents a flowchart representation of a method in accordance with a further embodiment of the present invention. In particular, this embodiment presents a method, used in a network for providing telecommunication service to a plurality of network subscribers, for detecting a change in a telecommunication service rate plan. This method can be used in conjunction with the method presented in association with FIG. 1 and FIG. 2 to detect rate plan changes from other interexchange carriers in order to update a rate database, for instance a rate plan database used for generating a billing record.

In step 140, a call schedule is received. The call schedule includes a plurality of sample calls to be made by an automated calling station. In a preferred embodiment of the present invention, the call schedule includes a call destination, a call time and a call duration for each of the plurality of sample calls. The call schedule further identifies one of a plurality of carriers and potentially an optional calling plan for each of the plurality of sample calls. In this preferred embodiment, the call schedule is derived to place calls that test various parameters of a carrier's rate plan by placing calls at different times of day, of different durations, and to different destinations.

In step 142, the plurality of sample calls are automatically placed on the network using the automated calling station. In a preferred embodiment, the automated calling station includes a plurality of telephone lines, each telephone line having an assigned carrier and wherein the step of receiving a call schedule includes receiving a plurality of call schedules, each of the plurality of call schedules corresponding to one of the plurality of telephone lines. In an alternative embodiment of the present invention a single call schedule includes sample calls that designate a particular carrier and potentially an optional calling plan. Each sample call is associated to one of the plurality of telephone lines by matching the one of the plurality of carriers for the sample call to the assigned carrier, and potentially an optional calling plan, for the one of the plurality of telephone lines. In a further alternative, a single call schedule includes sample calls that designate a particular telephone line directly.

In addition, in a preferred embodiment, each of the plurality of sample calls is reattempted up to y times if not completed. In a further embodiment, an error record is generated for reporting to a system administrator if at least one of the plurality of sample calls cannot be completed after y re-attempts. The generated error record includes the call schedule information corresponding to the call that could not be completed.

If at least one of the plurality of sample calls is completed the method proceeds to step 144 and at least one final billing record corresponding to at least one completed sample call is received. The final billing record includes call data for at least one completed sample call. In a preferred embodiment, the call data includes billed cost data that corresponds to the billed cost of the call, the call destination, the call time and the call duration, the carrier, a call mileage, an originating LATA and a terminating LATA for each of the completed sample calls.

In step 148 the billed cost data is compared to previous cost data that corresponds to the prior billed cost for a corresponding call. In step 150 a change in the rate plan is detected based on the comparison of the billed cost data to the previous cost data. In a preferred embodiment, step 150 includes comparing a previous cost element from the previous cost data to a corresponding billed cost element and detecting a change in the at least one rate plan if there is a difference between the previous cost element and the billed cost element. In other words, if the bill reflects that a particular call has a different cost from a call from a previous billing cycle, such as the most recent billing cycle, having the same carrier, optional calling plan, duration, mileage band, time of day and day of week—this means that a change in the corresponding rate plan has been detected.

In a preferred embodiment of the present invention, call data is generated, via the call schedule, for seven calls for each carrier, optional calling plan, time of day, and mileage band. In one embodiment, these calls are chosen to be 1,2,3,4,5,6 & 7 minutes in length. The choice of 1,2,3,4,5,6 & 7 minutes for the sample calls is not unique. Other sample call lengths can be used in conjunction with the present invention. In a second embodiment, the choice of 20,36,48, 60,72,84 & 96 seconds is used.

In an alternative embodiment of the present invention, the call data for each of the completed calls is used to generate a mean estimated first-minute and additional-minute rate for each carrier, time of day, day of week, mileage band and optional calling plan. A statistical analysis is performed to generate a statistical metric that indicates the degree of difference between previous rate data (generated either from a previous bill or from publicly available information) and the estimated rate data. Hypothesis testing is used to accept or reject the null hypothesis that the previous toll rate is correct. In this technique, the estimated toll rate is compared to a threshold, derived from a predetermined level of statistical confidence (e.g. 95% confidence or 99% confidence) in order to determine whether or not the null hypothesis can be rejected. A change in the rate plan is detected if the estimated toll rate is greater than the threshold.

Figure 5:
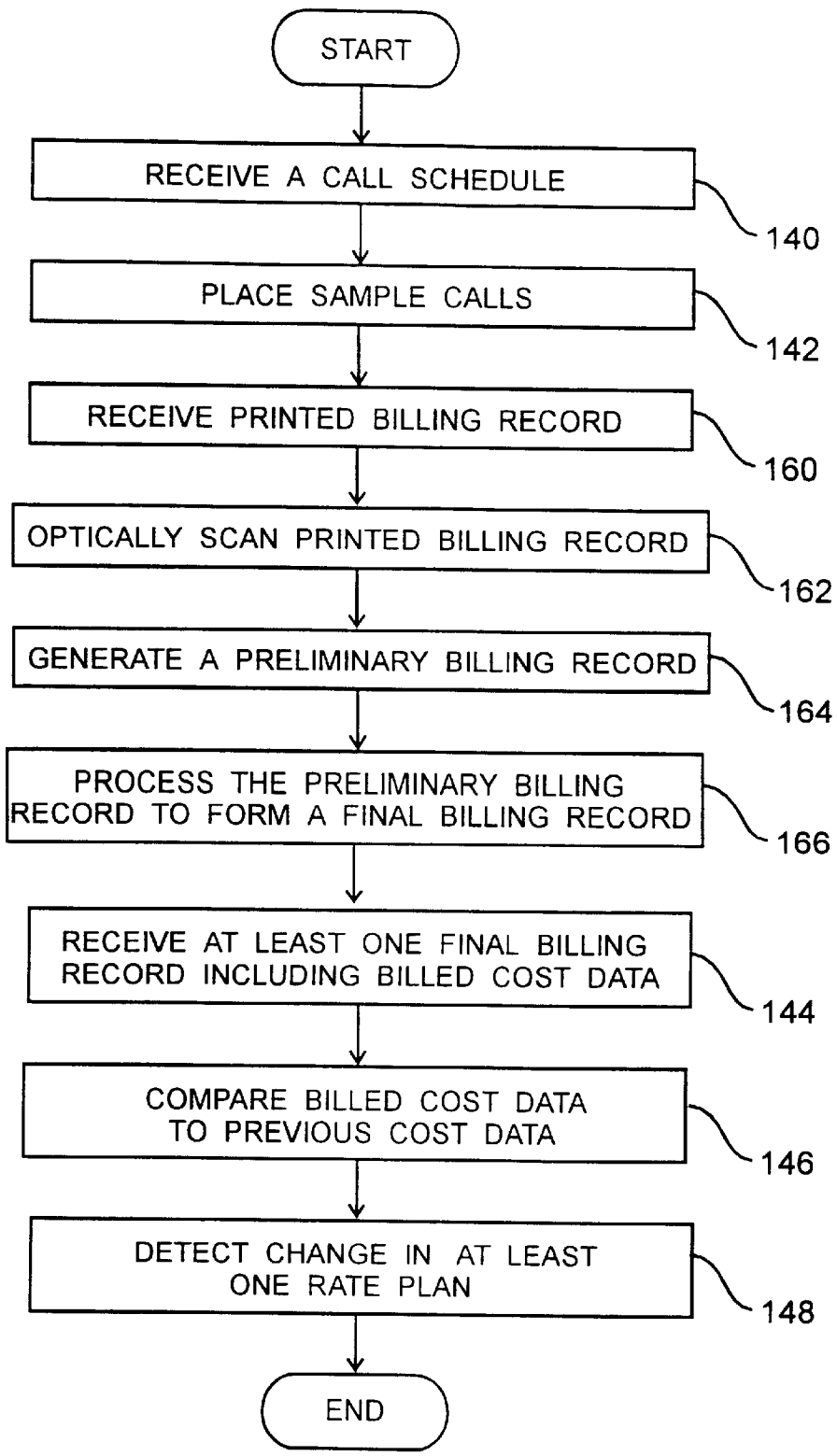
FIG. 5 presents a flowchart representation of a method used in accordance with an additional embodiment of the present invention.

FIG. 5 presents a flowchart representation of a method used in accordance with an additional embodiment of the present invention. In particular, the method of FIG. 5 includes steps 142–148 presented in association with FIG. 4 and further includes steps 160–166 that describe a method for generating a final billing record.

In step 160 a printed billing record is received corresponding to the completed sample call. In a preferred embodiment, the printed billing record, in the form of a billing statement, is received directly from the carrier. In step 162, the printed billing record is optically scanned to obtain a plurality of electronic image data. In step 164, a preliminary billing record is generated in electronic form by performing character recognition on the electronic image data. In step 166, the preliminary billing record is processed to form the final billing record by appending to the preliminary billing record the carrier, the call mileage, the originating LATA and the terminating LATA for the completed sample calls.

Figure 6:
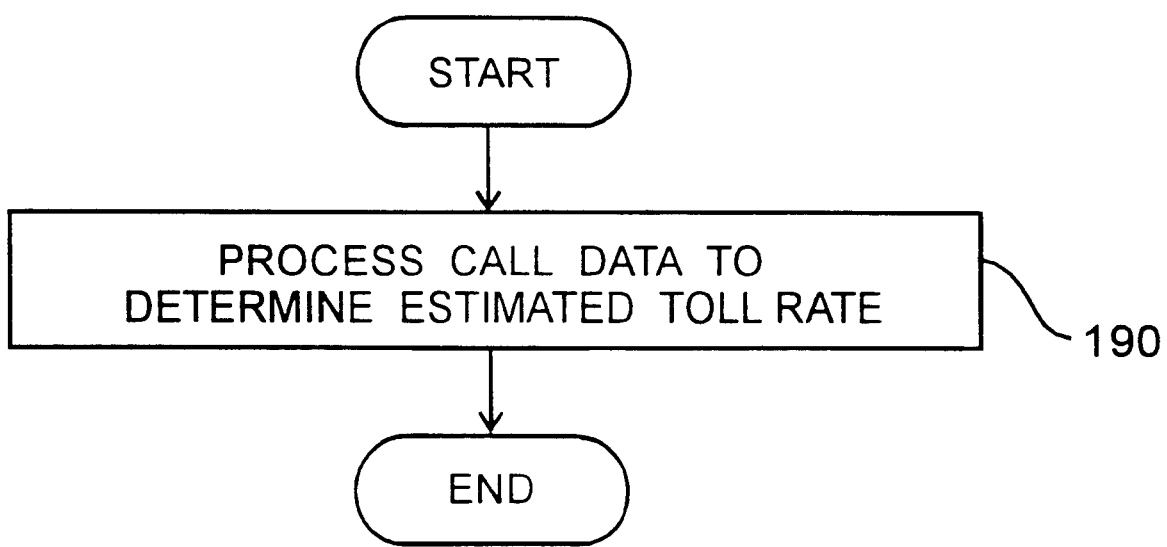
FIG. 6 presents a flowchart of a method used in accordance with one embodiment of the present invention.

FIG. 6 presents a flowchart of a method used in accordance with one embodiment of the present invention. In this embodiment, after a change in a rate plan has been detected for a particular carrier in accordance with the methods of FIGS. 4 and 5, a new toll rate is estimated. In step 190, the call data from that carrier and optional calling plan is used to determine estimated rate data. This estimated rate data represents an estimate of the new toll rate that is in use by that carrier to generate the bill for the completed sample calls.

In a preferred embodiment, call data for a particular carrier, time of day, day of week, optional calling plan and mileage band is processed using a logic algorithm that uses interval analysis to calculate estimated rate data that comprises estimated rate elements for the particular carrier, time of day, day of week, optional calling plan and mileage band. These estimated rate elements are determined by generating an upper and lower bound for the toll rate for the first minute of a call and for each additional minute. Either the upper or lower bounds for each rate element can be used as estimates of the new rate element. For example, for a particular carrier, time of day, day of week, optional calling plan, and mileage band, the new first minute rate element can be assigned to be the corresponding estimated upper bound and the new additional minute rate element can be assigned to be the corresponding estimated lower bound.

In a preferred embodiment of the present invention, the amount billed for the 1-minute call is used to generate an upper and lower bound on the first minute rate—based on the fact that the bill is rounded to or truncated to the nearest cent and also based on the possibility that the actual first minute rate can be a non-integer number of cents. The 2-minute call data is then processed to generate an upper and lower bound for the additional minute rate—based on the estimated first minute upper and lower bounds. The 3-minute call data is then processed to refine (narrow) the bounds on the additional minute rate which can then be used to refine bounds on the first minute rate.

The process proceeds to consider all of the data from the seven sample calls and to iteratively narrow the upper and lower bounds on the first and additional minute rates until the magnitude of the percentage change between iterations of the interval between the upper and lower bound, for either the initial or additional minute rate intervals, falls below a threshold of 0.00001% or until the completion of a predetermined number of maximum iterations. At this point the final upper and lower bounds are accepted and used, as discussed above, as new estimated rates. For this iterative technique to operate, at least two sample calls must be completed for the particular carrier, time of day, day of week, optional calling plan, and mileage band. In practice, the predetermined number of maximum iterations can be chosen to be greater than the actual number of iterations required for convergence with the 0.00001% threshold for a large set of sample data.

Figure 7:
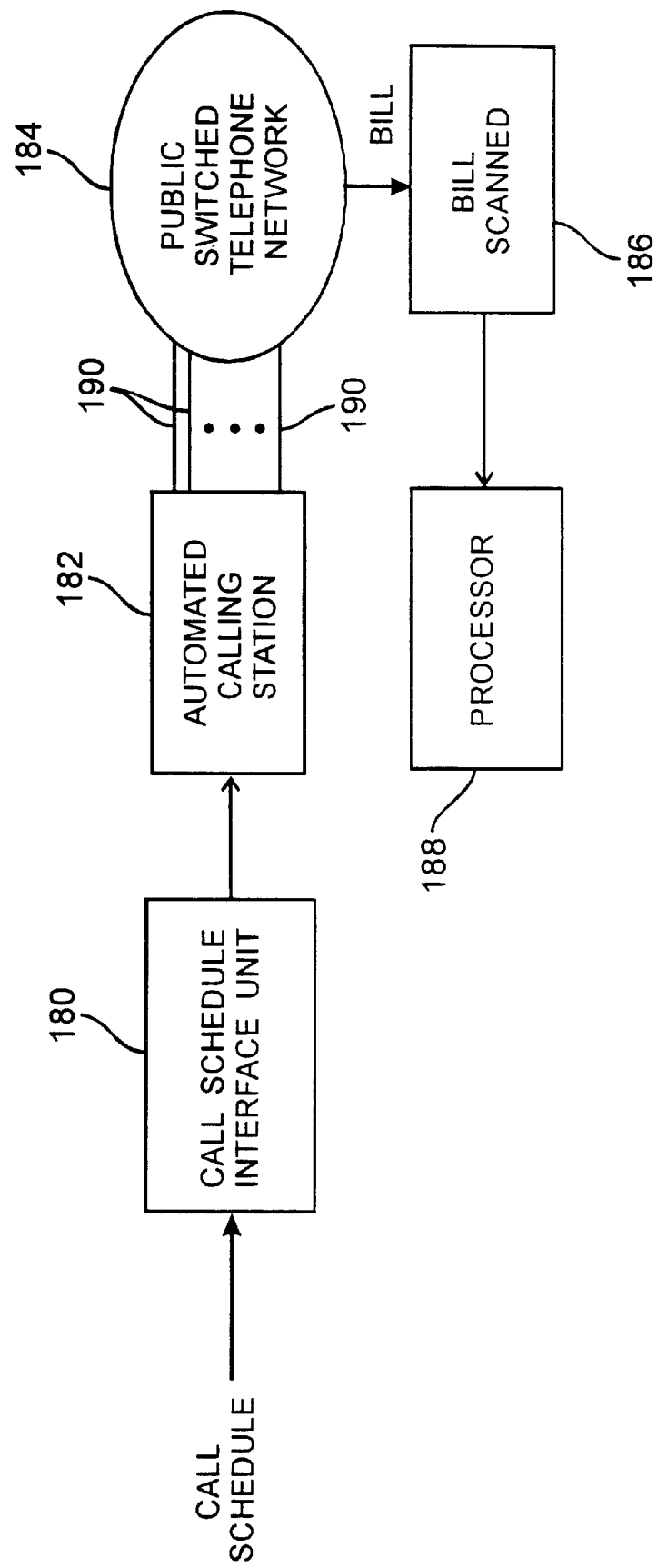
FIG. 7 presents a block diagram representation of a system in accordance with the present invention.

FIG. 7 presents a block diagram representation of a system in accordance with the present invention. In particular, FIG. 6 presents a system for implementing each of the methods and features described in conjunction with FIGS. 4, 5 and 6 described above.

Network 184, in a preferred embodiment of the present invention, is a public switched telephone network (PSTN) that provides telecommunication service to a plurality of network subscribers. Call schedule interface unit 180 receives a call schedule, the call schedule including a plurality of sample calls to be made by an automated calling station.

Automated calling station 182 is coupled to the call schedule interface unit 180. The automated calling station 182 places the plurality of sample calls automatically on the network 184. In a preferred embodiment of the present invention the automated calling station 182 is coupled to a plurality of telephone lines 190, each telephone line having an assigned carrier and potentially an optional calling plan and wherein the step of receiving a call schedule includes receiving a plurality of call schedules, each of the plurality of call schedules corresponding to one of the plurality of telephone lines. In an alternative embodiment of the present invention a single call schedule includes sample calls that designate either a particular carrier and optional calling plan. Each sample call placed by the automated calling station is switched to one of the plurality of telephone lines by matching the one of the plurality of carriers for the sample call to the assigned carrier and optional calling plan for the one of the plurality of telephone lines. In a further alternative, a single call schedule includes sample calls that designate a particular telephone line directly.

In a preferred embodiment of the present invention the automated calling station is implemented using a IBM Model P02 computer equipped with a Dialogic D/160 SC-LS voice processing and analog interface board. The specific functionality of this computer system is controlled using IBM, Callpath Directalk/2 voice processing software. The Directalk/2 software uses a node manager that sends programming commands, through Dialogic telephony hardware, to sixteen telephone lines that are connected to the board.

In a preferred embodiment of the present invention, the sample calls are placed on each individual line Q as follows. A call schedule is loaded onto line (call records are broken into time of day, day of week sections within call schedule). The system checks the current time and date and indexes to the next call record to be placed for line Q. The system, through Dialogic circuit board functionality, tells line Q to go off-hook. The system, again using functionality of D/160SC-LS board, checks for a dial tone on line Q.

If there is no dial tone, the system converts to slow down mode and attempts next call'sequence after a specific time delay. If after y 'no dial tone' conditions occur, the system will set an error flag to let the system know that possible line trouble exists. If a dial tone is detected, then the system places an outbound call(either direct dial, calling card, or toll free) again using D/160SC-LS board. The system, through dedicated detection device (1 per line), checks for call status. The call status is either: (1) successfully answered and held for correct duration; (2) successfully answered but held short of correct duration (3) busy signal on line; or (4) A-ring no answer. The system then records the call event in a Call Completion file (part of an on-board database).

For successful call attempts, the unique call record is not attempted again until the next bill cycle. For all other call status results the application will re-try the call record up to y attempts to achieve a successful attempt. If after y attempts the call has still not completed successfully, the final call attempt is recorded in the Error Log file and will not be reattempted until the next bill cycle. After all calls for the calling schedule loaded for line Q have either been successfully completed or logged in the error log file (within a particular billing cycle), the system remains idle until the bill cycle for line Q increments to next cycle.

Processor 188 receives at least one final billing record corresponding to at least one completed sample call, the final billing record including call data and previous cost data for the completed sample calls. Processor 188 compares the billed cost data to the previous cost data. A change in the rate plan is detected based on the comparison of the billed cost data to the previous cost data. In a preferred embodiment, processor 188 performs the techniques discussed in association with steps 146 and 148 of FIG. 4 and step 190 of FIG. 6.

A preferred embodiment of the present invention includes a bill scanner 186 for receiving a printed billing record corresponding to the completed sample calls. Billing scanner 186 includes an optical scanner equipped with optical character recognition software for optically scanning the printed billing record to obtain a plurality of electronic image data, and for generating a preliminary billing record in electronic form by performing character recognition on the electronic image data. In this embodiment the processor 188 receives the preliminary billing record from the bill scanner 186 and processing the preliminary billing record to form the final billing record by appending the carrier, the call mileage, the originating LATA and the terminating LATA for the completed sample calls.

While the term day of week has been used throughout description above, it should be recognized that telecommunication billing systems traditionally segregate days of the week only by the categories: holidays, Saturdays, Sundays, and other days of the week. However, more sophisticated segregation is possible as will be recognized by one of ordinary skill of the art.

While various embodiments of the present invention have been described in conjunction with a public switched telephone network, these embodiments could similarly apply to communications of messages over other telecommunication networks. In particular, other billing and rate plan monitoring systems, within the scope of the present invention, can be implemented in conjunction within other such telecommunications networks.

The various methods described herein, in a preferred embodiment, are intended for operation as software programs running on a computer processor. One of ordinary skill in the art will recognize that other hardware implementations such as application specific integrated circuits, programmable logic arrays and other hardware devices could likewise be constructed to implement the methods described herein. It should also be noted that the software implementations of the present invention could be stored on a tangible storage medium such as a magnetic or optical disk, read-only memory or random access memory and be produced as an article of manufacture.

Thus, there has been described herein a concept, as well as several embodiments including a preferred embodiment, of a method and system for generating a billing record and for detecting a change in a telecommunication service rate plan. The various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall the true spirit and scope of the invention.

What is claimed is:

1. A toll rate estimation method comprising:

receiving billing information for completed calls;

based on first received billing information, for at least some completed calls, generating an upper bound and a lower bound for an estimated toll rate for portions of the at least some completed calls; and based on second received billing information, refining bounds on the portions of the at least some completed calls to determine the estimated toll rate.

2. The toll rate estimation method of claim 1 wherein generating an upper bound and a lower bound comprises determining the upper bound and the lower bound based on received billing information for a one-minute duration call and wherein refining bounds comprises generating an upper bound and a lower bound for an additional minute rate based on received billing information for a two-minute duration call.

* * * * *